Oct. 13, 1936.  E. H. SPIEGL  2,057,280
GATHERING APPARATUS
Filed Jan. 24, 1933   3 Sheets-Sheet 1
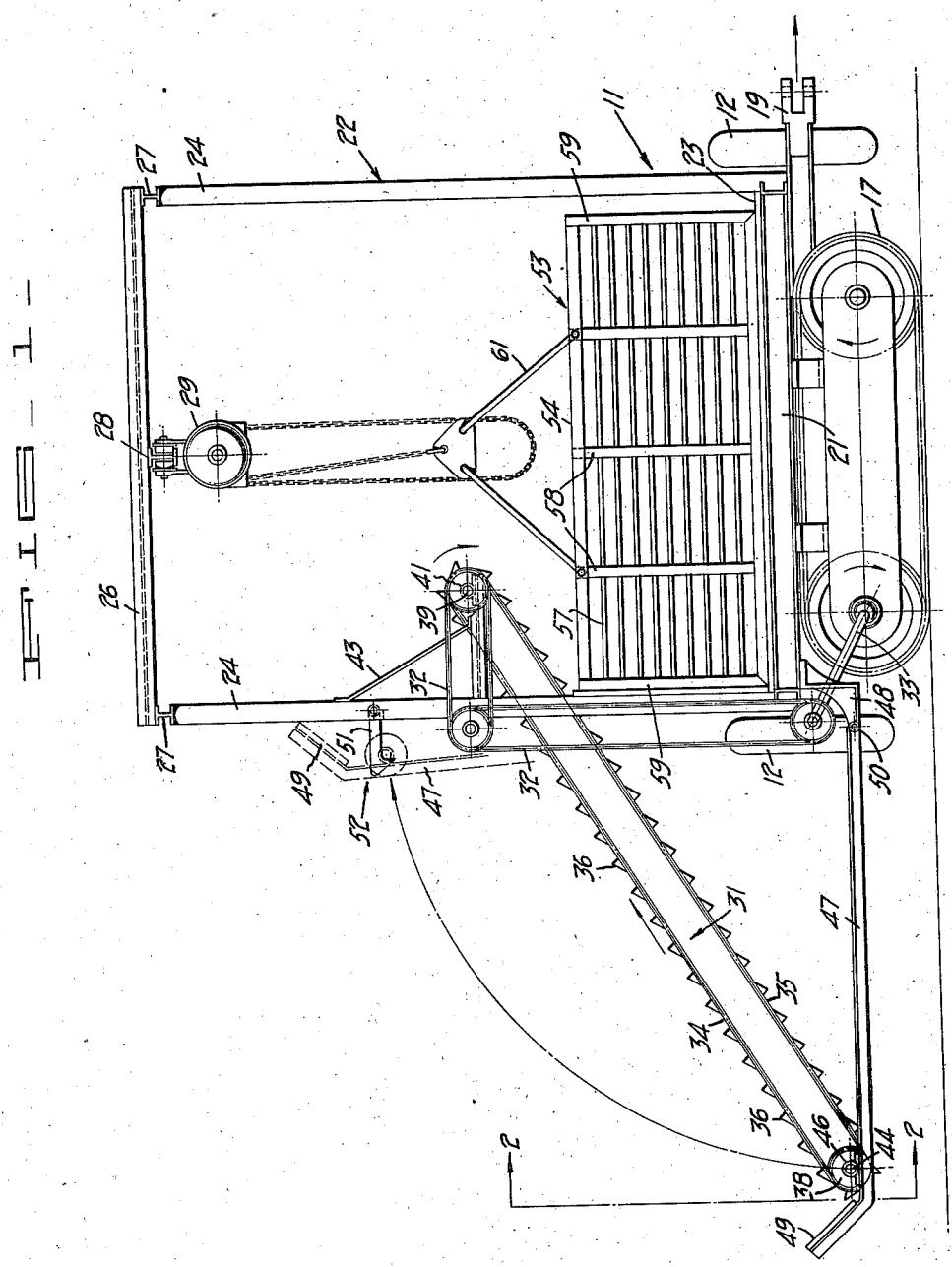
INVENTOR.
Ellis H. Spiegl
BY White, Prost, Hehr & Lothrop
ATTORNEYS.

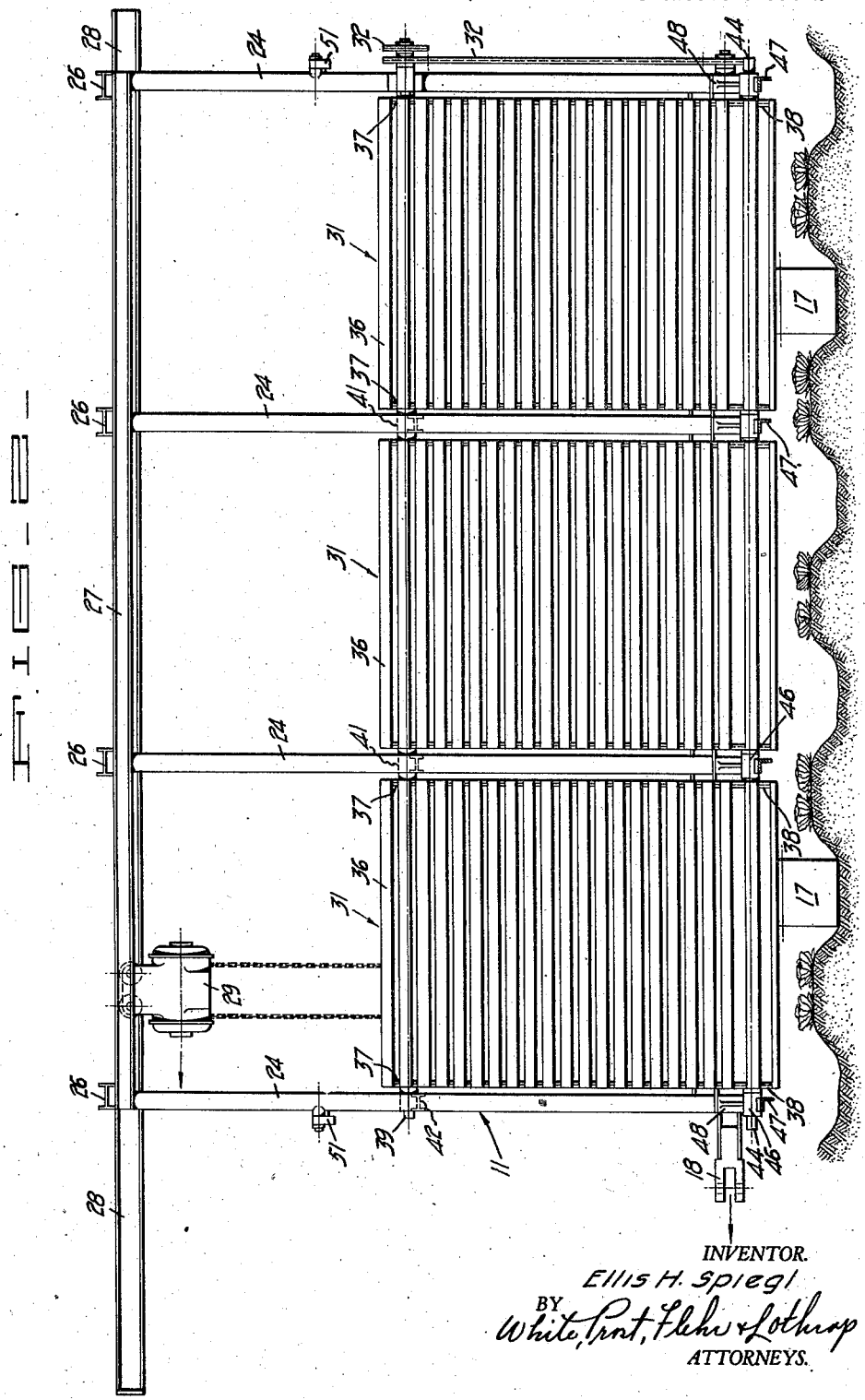

Oct. 13, 1936.   E. H. SPIEGL   2,057,280
GATHERING APPARATUS
Filed Jan. 24, 1933   3 Sheets-Sheet 3
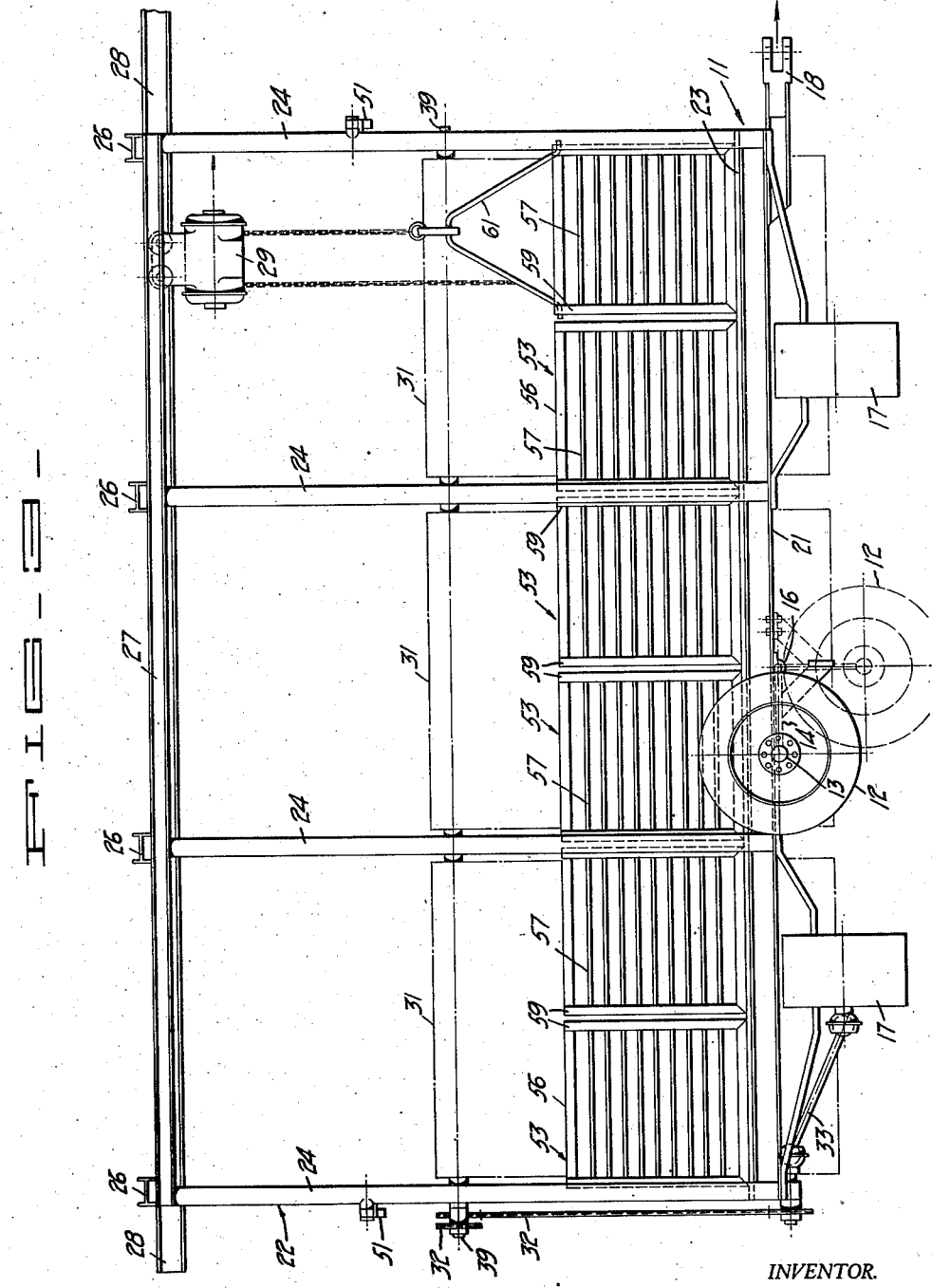
INVENTOR.
Ellis H. Spiegl
BY
White, Prost, Flehr & Lothrop
ATTORNEYS.

Patented Oct. 13, 1936

2,057,280

UNITED STATES PATENT OFFICE 2,057,280

GATHERING APPARATUS

Ellis H. Spiegl, Salinas, Calif.

Application January 24, 1933, Serial No. 653,222

2 Claims. (Cl. 214—83)

The invention, generally, relates to means and methods of harvesting field crops. More particularly, the invention relates to apparatus for and a mode of gathering field crops, such as lettuce and the like, substantially simultaneously with the removal of the crops from the soil.

Inasmuch as the apparatus of my invention has particularly adaptable to the gathering of lettuce and has been successfully employed with respect thereto, I shall describe the invention in such environment.

At the present time, and normally, fields for the growing of lettuce are prepared so as to provide a plurality of alternate rows of mounds and depressions which extend throughout the field. The lettuce is planted in double rows in the mounds, and the depressions are utilized for irrigation purposes as well as by workmen in planting and severing the crops. In standard or conventional lettuce fields these mounds are approximately 40 inches in width and are spaced uniformly over the field.

Heretofore, lettuce has been gathered almost universally in the following manner. When the time for harvesting arrives, empty crates of standard size are hauled to the field and distributed at intervals in the depressions over the field. About eight or ten pickers, in the normal case, are employed to select and sever the ripe lettuce and, upon severance, deposit the lettuce in the depressions as they progress over the field. These pickers are followed by approximately twice as many packers who pick up and pack the severed lettuce in the aforementioned crates. Following the packers is a loading crew which loads the packed crates upon trucks, for hauling to the plant where the crates are dumped and processed for "butting", removal of damaged leaves, grading and repacking for shipment in shipping crates. It is perhaps apparent that the repeated handling of the crops, including the field operations of gathering, packing and loading the lettuce, is somewhat cumbersome and is a relatively expensive process, especially in view of the large crews of workmen required to gather, pack and truck the crops.

A primary object of my invention is to provide a novel apparatus for gathering lettuce and similar crops which affords a saving in time and labor required for field operations and which obviates successive handling of the crops.

A further object of my invention is to provide apparatus of the aforementioned character which enables the gathering of the lettuce substantially simultaneously with the severance thereof from the soil.

A still further object of the invention is to provide apparatus for gathering lettuce and like crops which enables the dispensing with handling of relatively large numbers of small crates as well as with the packing and loading of the same in the field.

Another object of my invention is to provide apparatus, adaptable to the gathering of lettuce, which is relatively inexpensive and easy to operate and which is capable of gathering an entire field of crops in a minimum of time and with a minimum of labor.

Other objects of the invention, together with some of the advantageous features thereof, will appear from the following description of a preferred embodiment of the invention which is illustrated in the accompanying drawings, as well as of the mode of gathering crops of my invention.

In the drawings:

Figure 1 is a side elevation of an embodiment of the invention as used when advancing over a field of crops.

Figure 2 is an end elevation of the embodiment illustrated in Figure 1, a portion thereof being in cross-section on line 2—2 of Figure 1.

Figure 3 is an elevation similar to the showing of Figure 2 but viewed from the opposite end of the device.

In its preferred form, the gathering apparatus of my invention preferably comprises a vehicle adapted to advance over a field, a trailing conveyor on said vehicle, and means for actuating the conveyor during the advance of the vehicle whereby crops placed upon the conveyor are carried to the vehicle as it progresses over the field.

The preferred manner of utilizing my invention comprises advancing a vehicle over a field of crops, manually removing crops of the field adjacent to the advancing vehicle, and depositing the crops on a portion of the vehicle carried in a position relatively close to the soil, and then moving the crops from said position in a direction having a vertical component so as to carry the deposited crops in a different position on the vehicle as it progresses over the field.

In accordance with the invention, I provide a vehicle, generally designated by the reference number 11, which is supported for movement in a predetermined direction over a road or highway and which also is supported for movement over a field of crops in a direction at substantially a right angle to such predetermined direction. In other words, I provide a pair of wheels 12 for supporting the vehicle for movement along roads or highways, the wheels being journaled in bearings 13 on crank 14 which is pivotally mounted in bearings 16 carried at the sides of the vehicle, and I also provide a pair of spaced tracks 17, which conveniently can be equipped with tractor shoes, for supporting the vehicle for movement over a field of crops. The vehicle is adapted to be lowered from the wheels 12 to the tracks 17 as well as raised from the tracks to the wheels. Prior to lowering the vehicle, the cranks 14 are swung away from the ground and fastened to the frame of the vehicle in order to carry and maintain the wheels out of engagement with the ground when the vehicle is supported by the tracks 17. It is to be noted that the tracks 17 are so spaced that, upon the advance of the vehicle over a field of crops, the tracks span a plurality of mounds of the crops and ride in the depressions between the mounds. Under present methods of gathering lettuce, considerable lettuce is destroyed because one of the wheels, or two wheels on one side, of the standard type of truck which is employed to load the packed crates, ride in a depression while the other wheels necessarily ride upon the mounds of lettuce. This destruction of lettuce, as the gathering vehicle progresses over the field, is eliminated in the use of the apparatus of my invention.

In the illustrated embodiment of my invention, the vehicle 11 comprises a trailer and is provided with conventional draw-bars 18 and 19 for attachment to a draft source, such as a truck, tractor, or team, for drawing the vehicle respectively along roads or highways and across the field of crops. However, it is to be understood that, within the scope of the invention, a self-propelled vehicle may be employed and suitable driving wheels, drive connections between the wheels and the prime mover, and steering means incorporated therein.

The vehicle 11 preferably is constructed with a framework of rugged material, such as channel irons and I-beams, and includes a truck 21 and a superstructure 22, the latter being incorporated in the vehicle principally to facilitate unloading operations with the present embodiment of the invention. The truck 21 supports a floor or platform 23, fabricated either of metal or of durable material, and the superstructure 22 includes a plurality of uprights 24 extending from the platform 23 together with transverse bars 26 and longitudinally extending beams 27 at the top of the superstructure. I also provide a longitudinally extending beam 28, preferably an I-beam, which is positioned centrally of the top of the superstructure and which extends from both ends of the vehicle. The beam 28 slidably carries means, such as a block and tackle 29, for use in unloading crops from the vehicle and transferring the same to trucks for hauling to a central plant.

For initially receiving the crops of the field from the workmen engaged in severing the same from the soil, I provide a plurality of conveyors 31 which, in the present embodiment, are placed in driving connection with the tracks 17 and hence are actuated during the advance of the vehicle over a field. Any suitable drive connections between the tracks 17 and the conveyors 31 can be employed. In this instance I have utilized a chain drive, generally designated by the reference numeral 32, and rotatable shaft 33 which is universally connected between the tracks 17 and the chain drive 32. However, and within the scope of the invention, the conveyor 31 can be actuated independently of the tracks 17, or other movable elements of the vehicle, such as by an electric motor which can receive its energy from a generator actuated by the prime mover of the vehicle, all not shown. With the conveyors directly connected to such a motor, the actuation of the conveyors is controllable at the will of the operator of the vehicle.

Each of the conveyors 31 for receiving the crops preferably comprises a pair of spaced endless chains, each having an upper run 34 and a lower run 35. The chains are connected by a plurality of relatively closely spaced bars 36 and are trained over sprockets 37 and 38 at each extremity of the conveyor, the sprockets 37 being keyed to a shaft 39 which is driven by the tracks 17 through the aforementioned drive connections and including the sprockets 37. The shaft 39 is journaled in a plurality of bearings 41 which are carried by brackets 42 extending from the uprights 24 of the superstructure of the vehicle. Suitable brace rods 43 can be connected across the uprights and brackets 42, for taking up stresses upon the brackets. The sprockets 38 of each conveyor are keyed to an idler shaft 44 which extends across the vehicle and which is journaled in a plurality of bearings 46 carried by bars 47 which extend from the rear of the vehicle and which are fastened, by means of depending brackets 48, to the truck 21 of the vehicle. The bars 47 are so positioned and the conveyors are of such length as to permit the conveyors, in open position, to be carried relatively close to the ground and preferably just above the growing crops. A retaining guard 49 is fastened to the bars 48 and extends across all of the conveyors 31. Lettuce which is tossed upon the conveyors during the progress of the vehicle over a field has a tendency to roll away from the vehicle and the guard 49 prevents the falling of the crops to the ground. The advancing bars 36 of the conveyors pick up lettuce resting against the guard 49 and carry the same to the vehicle. It should be observed that the conveyors 31 are driven in a clockwise direction, as indicated in the drawings, and that the upper runs 34 thereof move in the same direction as the direction of advance of the vehicle over the field.

As stated above, the vehicle of my apparatus has been designed for movement along roads or highways in predetermined directions upon the wheels 12, as indicated by the arrows in Figures 2 and 3, and for movement over a field of crops at substantially a right angle to such predetermined direction upon the tracks 17, as indicated by the arrow in Figure 1. When traveling along roads or highways the conveyors 31 are carried at the side of the vehicle, rather than at the rear thereof, due to the change in direction of movement of the vehicle. In order to conform to traffic regulations, I have provided means for collapsing the conveyors 31 and for retaining the conveyors adjacent the uprights 24 of the superstructure. These means include pivotal mountings for the bars 47, as indicated at 50, as well as hooks 51 carried by the uprights 24 of the superstructure. When collapsed and carried adjacent the uprights 24, the conveyors take the positions shown in the dotted lines 52 in Figure 1 of the drawings.

The apparatus of my invention also includes a plurality of containers 53 which are adapted to be removably mounted upon the platform 23 of the vehicle 11, as illustrated in the drawings. The containers which I preferably employ have a capacity equivalent to the capacities of approximately fifteen to eighteen of the present or conventional type of lettuce crates and each container comprises an open top structure of generally rectangular configuration fabricated preferably of a metal such as iron. In the embodiment of container shown, I form the bottom of a plurality of relatively closely spaced iron straps which terminate at the ends of the bottom. The sides 54 and the ends 56 of the container also are formed of relatively closely-spaced metal straps 57 which extend entirely about the sides and ends of the container. A plurality of straps 58, spaced at greater distances than the straps 57, extend transversely of the sides 54 as well as transversely of the bottom of the container. Reinforcing straps 59 are provided at the several joints of the container.

In the embodiment of the invention illustrated, the conveyors 31 are so mounted and arranged that each conveyor serves and fills two containers during the traverse of the field by the vehicle. After the containers are filled they are transferred from the platform 23 of the vehicle to trucks for hauling to the plant, by means of the block and tackle 29 which is slidably carried by the beam 28, and a sling 61 is conveniently provided for connecting the block and tackle to each container.

While I have illustrated and described one means of transferring the gathered crops from the vehicle 11 to hauling trucks, it may be observed that other means can be incorporated in the apparatus to effect this purpose. For example, it is possible to install the platform 23 of the vehicle 11 at the same level as the hauling truck and to equip the platform with a plurality of rollers, not shown. The filled containers 53 can thus be manually moved, with the aid of the rollers on the platform 23, from the vehicle to the truck for hauling to the plant. Ramps can be employed to facilitate the transfer of the containers to the hauling truck. Another means of transferring the crops to a hauling truck can comprise a conveyor mounted for movement at substantially right angles to the conveyors 31, so that the lettuce carried to the vehicle by the conveyors 31 is deposited on this suggested transversely-moving conveyor. The hauling truck can be advanced along with the vehicle 11 over the field and can be equipped with a chute or inclined platform which establishes communication with the transverse conveyor and hence receives the crops directly from the vehicle. By this method and means the crops are continuously in motion from the time of deposition upon the conveyors 31 until they reach the hauling truck. The body of the hauling truck can constitute a relatively large receptacle for the reception of the lettuce from the vehicle.

Summarizing the above description of the embodiment of my invention, it will be observed that when it is desirous of gathering the crop of a field, the vehicle 11 is moved upon the supports 12 along the road or highway to the field where it is lowered to the tracks 17 and the wheels 12 are drawn up and retained against the truck 21. While travelling over the highway or road to the field, the conveyors 31 are in collapsed position and retained adjacent the uprights 24, but upon reaching the field, the conveyors 31 are lowered and extend rearwardly or trail the vehicle. The vehicle is then advanced over the field with the tracks travelling in the depressions and spanning a plurality of lettuce mounds. A group of pickers follow the vehicle and select and sever ripe lettuces and deposit the same upon the conveyors 31 which are actuated during the advance of the vehicle. The conveyors carry the crop to the containers 53 which are subsequently transferred from the vehicle to the hauling truck. At the conclusion of operations in one field the vehicle can be raised from the tracks 17 to the supports 12 and then moved to some other field for gathering the crops.

While I have illustrated the preferred embodiment of my invention in the accompanying drawings, it is to be understood that I am not to be limited to the embodiment shown, as my invention, as defined in the appended claims, can be embodied in a plurality and variety of forms.

I claim:

1. Apparatus for gathering a row crop, such as lettuce, comprising a vehicle movable over a field containing said crop in rows, a trailing conveyor of sufficient width to extend over a plurality of said rows and disposed on said vehicle with its trailing end relatively low and its leading, discharge end relatively high, and a receiving container considerably narrower than said conveyor located directly under the discharge end of said conveyor and shiftable transversely of said vehicle to receive said crop from different transverse portions of said conveyor.

2. A gathering apparatus comprising a vehicle adapted to advance over a field of a crop planted in rows, a container removably mounted on said vehicle, a trailing conveyor suspended from said vehicle and extending laterally over a plurality of said rows, means for actuating said conveyor during the advancement of said vehicle over the field whereby crops placed on said conveyor are carried to said container, and means on said vehicle for lifting said container and moving said container laterally to any of a plurality of laterally displaced positions in front of said conveyor.

ELLIS H. SPIEGL.